(No Model.)

E. T. CONRAD.
BALANCED SLIDE VALVE.

No. 273,961. Patented Mar. 13, 1883.

WITNESSES:
J. D. Garfield
C. Sedgwick

INVENTOR:
E. T. Conrad
BY Munn & Co.
ATTORNEYS.

UNITED STATES PATENT OFFICE.

EUGENE T. CONRAD, OF CADILLAC, MICHIGAN.

BALANCED SLIDE-VALVE.

SPECIFICATION forming part of Letters Patent No. 273,961, dated March 13, 1883.

Application filed March 28, 1882. (No model.)

*To all whom it may concern:*

Be it known that I, EUGENE T. CONRAD, of Cadillac, in the county of Wexford and State of Michigan, have invented a new and useful Improvement in Balanced Slide-Valves, of which the following is a full, clear, and exact description.

The object of my invention is to relieve the friction of slide-valves on their seats, caused by the steam-pressure, and consequently to save the rapid wear of the valve-seats and reduce the power required to move the valves.

It consists in the combination of parts of a steam-chest and slide-valve, whereby the parts may be adjusted to perform their office without opening the chest, as hereinafter described and set forth.

Reference is to be had to the accompanying drawings, forming a part of this specification, in which similar letters of reference indicate corresponding parts in both the figures.

Figure 1:
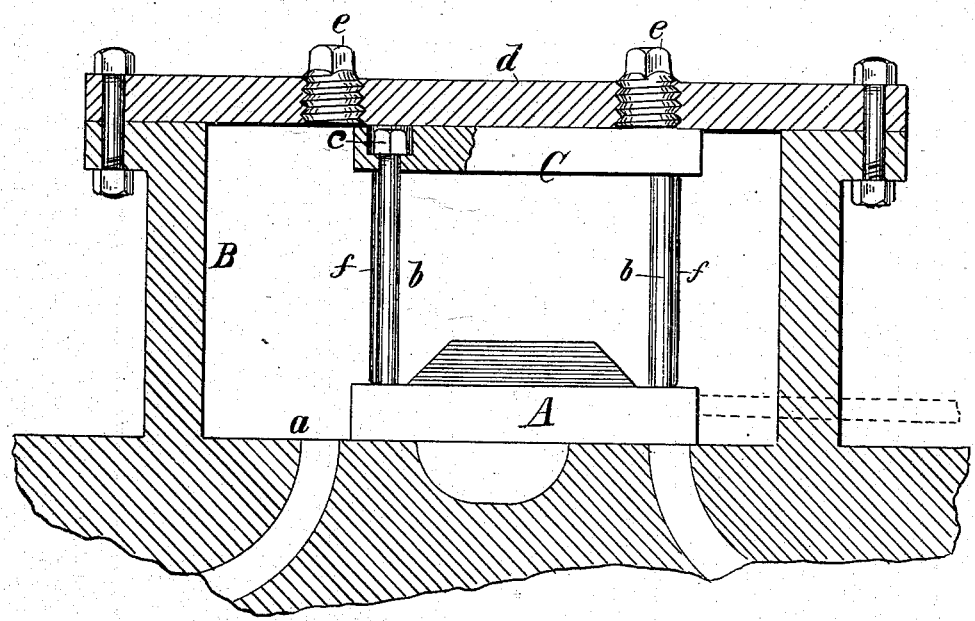
Figure 2:
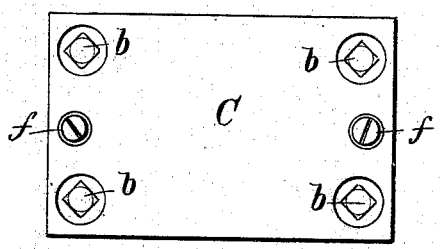

Figure 1 is a sectional elevation of a steam chest and valve with my improvements, and Fig. 2 is a plan view of the plate.

A is a slide-valve of ordinary character, working on seat *a* in steam-chest B. C is a plate attached rigidly to the valve by bolts *b*, so that it shall move with the valve. This plate is at the same time adjustable vertically on the bolts for the purpose of adjusting it so that the combined parts A *b* C shall neatly fit the bottom and top of the steam-chest B. This plate C is of the same width and length as the valve, so that it has the same area of surface, or nearly so, and it is in contact with the under side of the steam-chest cover *d*. The bolts *b* are preferably at the corners of the valve and the plate, and the plate is countersunk to receive the nuts *c* on the ends of the bolts. The cover *d* has holes, through which the nuts can be tightened with a key, so as to avoid the necessity of removing the cover, and screw-plugs *e* are fitted in the holes to close them. By this means the plate C may be drawn slightly free from the cover, to prevent friction from expansion of the valve and rods *b*, and the most perfect adjustment of the valve readily secured, even while steam is on. The plate, having the same area as the valve, receives equal pressure, and such pressure is exerted against the downward pressure on the valve. The valve is thus relieved of the great pressure, and requires but little power for its movement on its seat. The adjustment should be made so that there shall be a slight excess of pressure on the valve, which will cause it to fit steam-tight and prevent leakage. For setting the plate C up against the cover, set-screws *f f* are fitted in the ends of the plate, with their lower ends taking upon the valve.

This improvement may be applied to stationary, locomotive, and other engines, and by its application the usual rapid wear of the valve-seats is prevented.

Having thus described my invention, I claim as new and desire to secure by Letters Patent—

In combination with the steam-chest B, slide-valve A, bolts *b*, and balance-plate C, provided with countersinks for nuts *c*, the key-holes and screw-plugs *e*, through the top *d* of the steam-chest, and the screw-nuts *c* in said countersunk holes on bolts *b*, as shown and described.

EUGENE T. CONRAD.

Witnesses:
ROBERT CHRISTENSEN,
R. L. RICE.